United States Patent
Blackwood

(10) Patent No.: US 10,032,161 B2
(45) Date of Patent: Jul. 24, 2018

(54) SYSTEM AND METHOD FOR TRANSFERRING FUNDS FROM A SENDER ASSOCIATED WITH A FIRST COUNTRY HAVING A FIRST CURRENCY TO A RECIPIENT ASSOCIATED WITH A SECOND COUNTRY HAVING A SECOND CURRENCY

(71) Applicant: Paul E. Blackwood, Kalamazoo, MI (US)

(72) Inventor: Paul E. Blackwood, Kalamazoo, MI (US)

( * ) Notice: Subject to any disclaimer, the term of this patent is extended or adjusted under 35 U.S.C. 154(b) by 581 days.

(21) Appl. No.: 13/744,602

(22) Filed: Jan. 18, 2013

(65) Prior Publication Data

US 2013/0185186 A1    Jul. 18, 2013

Related U.S. Application Data

(60) Provisional application No. 61/587,923, filed on Jan. 18, 2012.

(51) Int. Cl.
| | |
|---|---|
| *G06Q 40/04* | (2012.01) |
| *G06Q 20/10* | (2012.01) |
| *G06Q 20/38* | (2012.01) |

(52) U.S. Cl.
CPC .......... *G06Q 20/381* (2013.01); *G06Q 20/10* (2013.01); *G06Q 40/04* (2013.01)

(58) Field of Classification Search
CPC ......... G06Q 40/04; G06Q 20/10; G06Q 20/38
USPC .......................................................... 705/37
See application file for complete search history.

(56) References Cited

U.S. PATENT DOCUMENTS

| | | |
|---|---|---|
| 7,797,234 B2 | 9/2010 | Avazian |
| 2001/0011241 A1* | 8/2001 | Nemzow ......................... 705/35 |
| 2002/0161692 A1* | 10/2002 | Loh et al. ........................ 705/37 |
| 2007/0067237 A1 | 3/2007 | Snow |
| 2007/0124242 A1* | 5/2007 | Reis, Jr. .......................... 705/39 |
| 2007/0214091 A1 | 9/2007 | Hansen |
| 2008/0210752 A1* | 9/2008 | March ........................... 235/379 |

* cited by examiner

*Primary Examiner* — Jason Borlinghaus
*Assistant Examiner* — Ambreen A. Alladin
(74) *Attorney, Agent, or Firm* — Howard & Howard Attorneys PLLC

(57) ABSTRACT

A system and method for transferring funds from a sender in a starting currency to a desired recipient in a final, different currency. The system and method allows a sender to select a conversion rate from a plurality of conversion rates and the associated currency converter financial institution to conduct the transfer from the sender to the recipient.

19 Claims, 16 Drawing Sheets

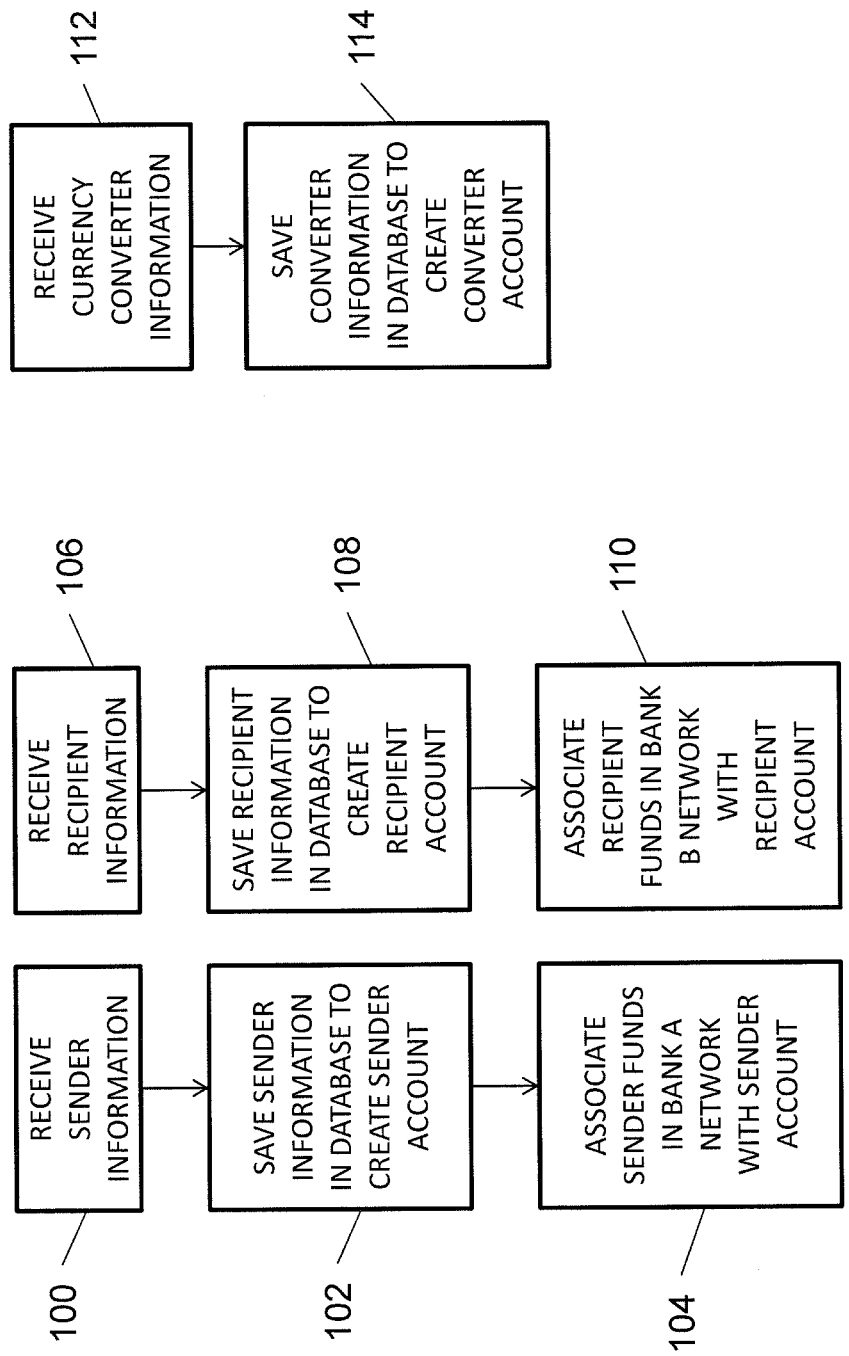

FIG. 5

Homepage

Company Name

Purchase an account to send money internationally
or locally anytime at time of day -even at midnight,
from your home computer or Smartphone directly
to a friend's debit card for easy access.
No paper, no lines. Its easy!

You can even choose your
overseas bank & best exchange rate!

<div align="center">

Create An Account

Sign In

</div>

Use any ATM or participating bank
to obtain your cash fast.
Conveniently add credit your account
by direct deposit,
purchasing credit online,
or at any authorized retailer Copyright © 2011 Company Name. All Rights Reserved.  Help/Suggestions   Contact Us   Privacy Policy   Terms of Service
www.insertcompany'swebsitehere.com

FIG. 6

(For Individual) Create an Account

Company Name

Create Account

If you have a Network Debit Card, you may enter that number in space below.
You may also choose to sync your card number after you've set up your account:
Enter Network Debit Card #: _____
Re-enter Network Debit Card #: _____

Name: _____
Address: _____
City: _____
State: _____
ZIP/Postal Code: _____
Country: _____
Tel: _____
*Driver's License #: _____
*or State ID #: _____
Date of Birth: __/__/____
Email Address: _____
Security Question: _____
Answer: _____

Desired User Name: _____
Password: _____
Re-enter Password: _____

Payment Information

Type of Card: Debit, Credit, Gift Card
Name of Account Holder: _____
Account No. : _____
Re-enter A/C No.: _____
Today's Charge Is: $$$$$$$$
___ Check this box to agree with today's charge After submitting your information with your
payment, you will receive your account
number in the place provided below.
This number will also appear in
your account profile upon log in at all times.

Pay & Submit Information

Here is your new account number. Thank you for creating an account with us.
A/C No.: 125456570011

Copyright © 2011 Company Name. All Rights Reserved. Help/Suggestions   Contact Us   Privacy Policy   Terms of Service
www.insertcompany'swebsitehere.com

FIG. 7

(Corporate Users, e.g. universities, schools, small businesses, etc.)
Create an Account

Company Name

Create Corporation's Account

Company's Name: _____
Address: _____
City: _____
State, Province, Parish: _____
ZIP/Postal Code: _____
Country: _____
Tel: _____
Tax ID Number #: _____
Employee ID No: _____
Name(s) of Authorized Users of the Account: _____
Desired Number of Sub Accounts: ___
Email Address: _____
Security Question: _____
Answer: _____

Desired User Name: _____
Password: _____
Re-enter Password: _____

Payment Information

Type of Card: Debit, Credit, Other
Name of Account Holder: _____
Account No. : _____
Re-enter A/C No.: _____
Today's Charge Is: $$$$$$$$
___ Check this box to agree with today's charge After submitting your information with your
payment, you will receive your account
number in the place provided below.
This number will also appear in
your account profile upon log in at all times.

Pay & Submit Information

Here is your new account number. Thank you for creating an account with us.
A/C No.: 78885552222

Copyright © 2011 Company Name. All Rights Reserved. Help/Suggestions   Contact Us   Privacy Policy   Terms of Service
www.insertcompany'swebsitehere.com

FIG. 8

(For Financial Institution - i.e. Bank, Credit Union etc.) Create an Account

---

Company Name

Create Financial Institution's Account

Institution's Name: _____
Address: _____
City: _____
State, Province, Parish: _____
ZIP/Postal Code: _____
Country: _____
Tel: _____
Tax ID Number #: _____
Name(s) of Authorized Users of the Account: _____
Employee ID No: _____
Email Address: _____
Security Question: _____
Answer: _____

Desired 4 - 5 Character User Code: _____
Password: _____
Re-enter Password: _____

Payment Information

Type of Card: Debit, Credit, Other
Name of Account Holder: _____
Account No. : _____
Re-enter A/C No.: _____
Today's Charge Is: $$$$$$$
___ Check this box to agree with today's charge After submitting your information with your
payment, you will receive your account
number in the place provided below.
This number will also appear in
your account profile upon log in at all times.

Pay & Submit Information

Here is your new account number. Thank you for creating an account with us.
A/C No.: 655555122222

Copyright © 2011 Company Name. All Rights Reserved. Help/Suggestions   Contact Us   Privacy Policy   Terms of Service
www.insertcompany'swebsitehere.com

FIG. 9

(Individual & Corporate User Log In page)

Company Name

Member Log In

User Name: _____
        Country: _____
    Account Number #: _____
        Password: _____

[Login]

Copyright © 2011 Company Name. All Rights Reserved. Help/Suggestions   Contact Us   Privacy Policy   Terms of Service
www.insertcompany'swebsitehere.com

FIG. 10

(Financial Institution, e.g. banks, credit union's, etc., - Log In page)

Company's Name

Financial Institution
Administrator Log In (Authorized User) User Name: _____
                Country: _____
Institution Code & Account Number : _____
               Password: _____

[Login]

Copyright © 2011 Company Name. All Rights Reserved. Help/Suggestions   Contact Us   Privacy Policy   Terms of Service
www.insertcompany'swebsitehere.com

FIG. 11

(For Individual) To Sync Account with Network Card

---

Company Name            My Account   Welcome: John Doe   Logout

Home   My Profile   Buy Credit   Sync A/C to Card   Manage My Account   Add New Friend Account   View History Like Us on Facebook   PANIC   UNPANIC Sync Account to Card My Account No: 5412 5632 6514 1012

Enter Card No.: _____
                             Re-enter Card No.: _____

Sync Account to Card Now

Copyright © 2011 Company Name. All Rights Reserved. Help/Suggestions   Contact Us   Privacy Policy   Terms of Service
www.insertcompany'swebsitehere.com

(For Corporate Users, e.g. Schools, Universities, Small Businesses)
To Sync Account with Network Card

---

Company Name          My Account   Welcome: John Doe   Logout

Home   My Profile   Buy Credit   Sync A/C to Card   Manage My Account   Add New Friend Account   View History Like Us on Facebook   PANIC   UNPANIC Sync Account to Card My Account No: 5412 5632 6514 1012

Enter Card No. 1: _____
                          Re-enter Card No. 1: _____

Enter Card No. 2: _____
                          Re-enter Card No. 2: _____

Enter Card No. 3: _____
                          Re-enter Card No. 3: _____

Click here to add more lines and sync more cards
                                            Sync Account to Card Now Copyright © 2011 Company Name. All Rights Reserved. Help/Suggestions   Contact Us   Privacy Policy   Terms of Service
www.insertcompany'swebsitehere.com

FIG. 13

(Financial Institution e.g. Banks, Credit Union's, etc., - Homepage)

Company Name  [My Account]  Welcome: Bank of John Doe  [Logout]

[Home]     [View History]     [View Traffic Profile for Previous 12hr]     [View Traffic Profile for Previous 24hr]

Account No: 5412 5632 6514 1012

Institution's Code: HNR735

Traffic Window showing Traffic Trend graph here

Conversion: US Dollars to Jamaican Dollars
Current Rate: [$1 US = _____ ]
New Rate Beginning Next Hour: [$1 US = _____ ]
Confirm New Rate for Next Hour: [$1 US = _____ ]

[Set New Rate Now]

Copyright © 2011 Company Name. All Rights Reserved. Help/Suggestions   Contact Us   Privacy Policy   Terms of Service
www.insertcompany'swebsitehere.com

FIG. 14

(Individuals & Corporate Users - Homepage)

Company Name        My Account  Welcome: John Doe  Logout

Home Admin | My Profile | Buy Credit | Sync A/C to Card | Manage My Account | Add New Friend Account | View History
Like Us on Facebook | PANIC | UNPANIC My Account No: 5412 5632 6514 1012

Starting Balance:  $137.28 USD

Select Country:  JAMAICA
ISRAEL
GERMANY

Home City Weather:      Kalamazoo, MI    74 F   Windy
Your BFF's Current City: Kingston, Jamaica  94 F   Sunny Bank Selected:   Bank of Nova Scotia Select Rate:  > BNS   $1 USD  $81.46 JMD <
NCB   $1 USD  $80.78 JMD
RBTT  $1 USD  $80.76 JMD
WKR   $1 USD  $79.91 JMD How Much Can I Send Now :   Calculator ?

Amount Converting:    $127.32 USD

Select Card Number From Friend List to Credit:  > 3412 5632 6514 1012 /Dad < JM
3452 5632 6514 1012 /Peter  JM One Time or Recurring:  > One Time <

EST:       12:00 PM
Local Time: 12:00 PM

Friend Mobile Alert Number:   876- 470-1171

Message:   Hey Dad. I just sent it off.
Check your card
And please tell Mary all is well
Charge Me This:   $7.49 USD Ending Balance:   $2.47 USD
Local Currency Credited $10371.48 JMD Confirm & SEND    $127.32 USD

FIG. 15

(For Individuals and Corporate Users)
Buy Credit -Applying Credit to Network Card)

Company Name          My Account  Welcome: John Doe   Logout

Home  My Profile  Buy Credit  Sync A/C to Card  Manage My Account  Add New Friend Account  View History Like Us on Facebook  PANIC  UNPANIC My Account No: 5412 5632 6514 1012

Buy Credit - Applying Credit to Your Account

Payment Information

Type of Card Paying With: Debit, Checking, Gift Card
Name of Account Holder: _____
Debit Account No. : _____
Re-enter Debit A/C No.: _____

How much are you adding to your network a/c today? : _____
                    Re-enter that amount: _____

Today's Service Charge Is: $$$$$$$$
___ Check this box to agree with today's charge Total Charge: _____

Pay Now

Here: Insert automated IMAGE OF COMPANY's logo

Copyright © 2011 Company Name. All Rights Reserved. Help/Suggestions  Contact Us  Privacy Policy  Terms of Service
www.insertcompany'swebsitehere.com

FIG. 16

(For Individuals & Corporate Users - Adding Friends)

Company's Name    My Account   Welcome: John Doe   Logout

Home  My Profile  Buy Credit  Sync A/C to Card  Manage My Account  Add New Friend Account  View History Like Us on Facebook  PANIC  UNPANIC Sync Account to Card My Account No: 5412 5632 6514 1012

Friend's Name: _____
Friend's User Name, friend's email address or friend's Network A/C Number: _____
Friend's Country: _____

[Security Feature]
Friend's symbol, picture, or logo will automatically appear in box
below as soon as friend's user name is confirmed by system Add Friend Now Copyright © 2011 Company Name. All Rights Reserved. Help/Suggestions   Contact Us   Privacy Policy   Terms of Service
www.insertcompany'swebsitehere.com (For Individuals - Panic)

(For Corporate Users - Panic)

(For Individuals & Corporate Users - UnPanic)

(Financial Users - Traffic Page)

SYSTEM AND METHOD FOR TRANSFERRING FUNDS FROM A SENDER ASSOCIATED WITH A FIRST COUNTRY HAVING A FIRST CURRENCY TO A RECIPIENT ASSOCIATED WITH A SECOND COUNTRY HAVING A SECOND CURRENCY

RELATED APPLICATIONS

This application claims the benefit of U.S. Provisional Patent Application No. 61/587,923, filed on Jan. 18, 2012, the contents and advantages of which are hereby incorporated by reference.

FIELD OF THE INVENTION

This invention relates to a system and method for converting funds from a starting currency to a final currency and transferring the converted funds from a sender to a recipient. The invention also relates to options provided to the sender when transferring the funds.

BACKGROUND OF THE INVENTION

Many different currencies are used throughout the world for financial transactions. In the United States, the currency is the U.S. Dollar. In Germany, France, Italy, and other countries in Europe, the currency is the Euro. The Jamaican Dollar is the currency of Jamaica. Each currency has different values relative to other currencies and, in some cases, those values float based on global economics and other factors.

Owing to the different values of different currencies relative to one another, currency converters such as financial institutions offer conversion rates (aka exchange rates) to convert one type of currency to another. Conversion rates used by these financial institutions often fluctuate. Furthermore, the conversion rates offered by different financial institutions at a given time can widely vary. The result being that engaging one financial institution over another for converting funds can result in a higher conversion yield and thus more value.

In a typical transaction with a money transfer company the sender is required to pay a standard conversion fee regardless of the different conversion rates being offered by different financial institutions. One of the disadvantages of such a system to the sender is that they are unable to take advantage of potentially lower rates offered by other financial institutions.

SUMMARY OF THE INVENTION

This invention provides a system for transferring funds from a sender to a desired recipient. The system includes a sender workstation having a display device and an input device for entering transaction information into a customer module of software. The transaction information includes an identification of the desired recipient. The transaction information further includes an amount to be transferred in the starting currency, and an identification of the final currency of the funds to be transferred from the sender to the recipient.

The system further includes an account network in communication with the sender workstation. The account network includes one or more servers operating a database for storing the transaction information and associating the transaction information with a unique sender account number.

The account network also has access to available funds for transfer by the sender wherein the available funds are in a starting currency.

A plurality of converter workstations are in communication with the account network. Each of the converter workstations is associated with a currency converter (e.g., a financial institution such as a bank) capable of converting funds from the starting currency to the final currency. The converter workstations each have an input device for entering converter information into a conversion module of the software wherein the converter information includes a unique converter identification number and a conversion rate for converting funds from the starting currency to the final currency. The customer module displays on the display device the conversion rates of each of the plurality of converters. This allows the sender to select the conversion rate and associated converter for transferring the funds to the recipient.

The invention also provides a method for transferring funds from the sender to the desired recipient. The method includes receiving transaction information from the sender including the identification of the recipient, an amount to be transferred in the starting currency, and an identification of the final currency of the funds to be transferred. The method further includes storing the transaction information. The transaction information is associated with the unique sender account number. The transaction information is also associated with available funds for transfer by the sender wherein the available funds are in a starting currency.

The method also includes receiving converter information from each of the plurality of currency converters including receiving, from each, a conversion rate for converting funds from the starting currency to the final currency. Once received, the conversion rates are displayed to the sender thereby allowing the sender to select the conversion rate and associated converter for transferring the funds to the recipient.

One advantage of this system and method is the ability for the sender to select a currency converter (e.g., financial institution) that they trust or to select a currency converter that provides a better conversion rate resulting in a higher conversion yield and thus a higher amount of funds ultimately transferred to the recipient.

BRIEF DESCRIPTION OF THE SEVERAL VIEWS OF THE DRAWINGS

Advantages of the invention will be readily appreciated as the same becomes better understood by reference to the following detailed description when considered in connection with the accompanying drawings wherein:

FIG. 2 is a flow chart illustrating creation of a sender account;

FIG. 3 is a flow chart illustrating creation of a currency converter account;

FIGS. 5-20 are screen shots of web based graphical interfaces implementing software to carry out this invention.

DETAILED DESCRIPTION

Figure 1:
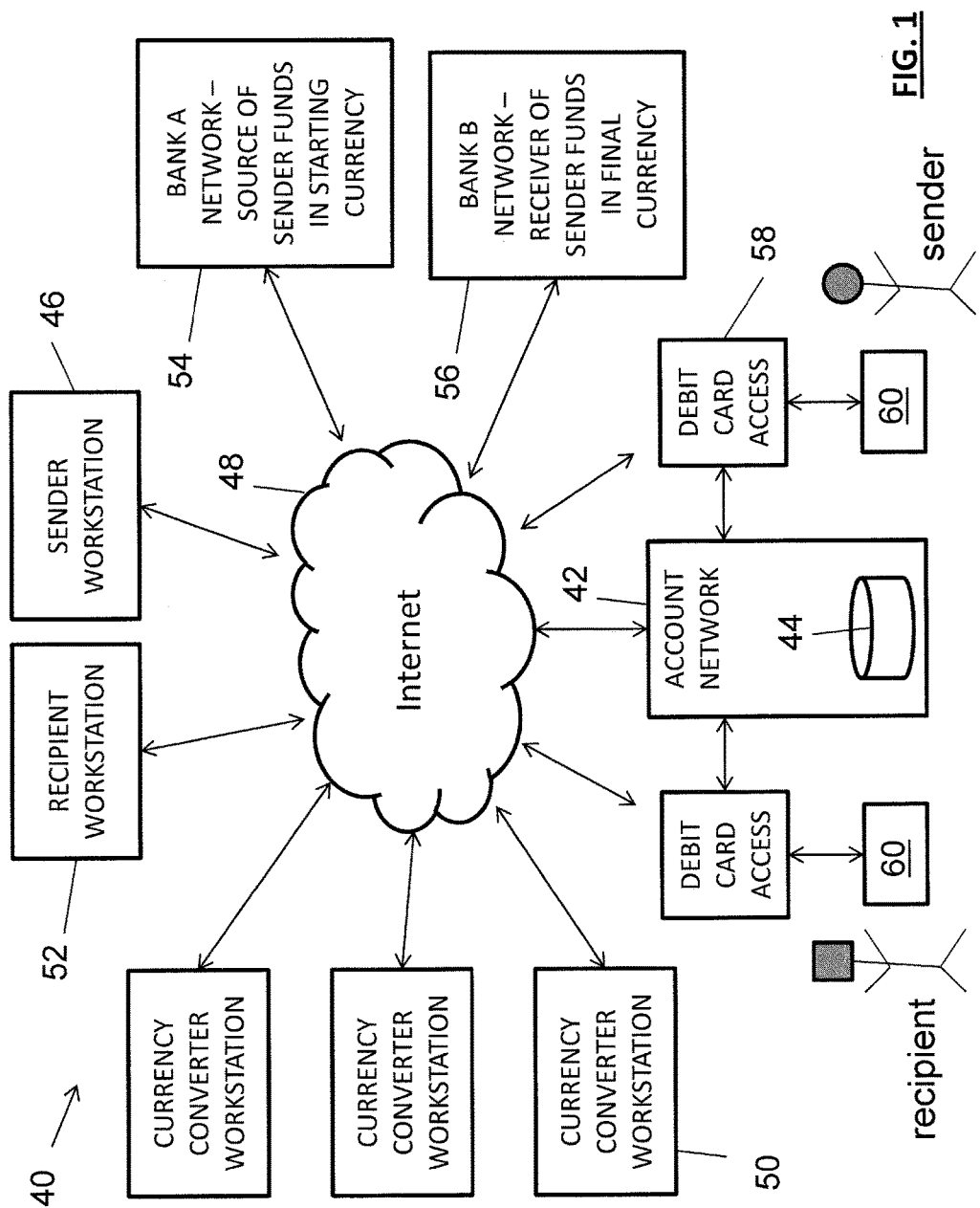
FIG. 1 is a block diagram illustrating a system for converting funds from a starting currency to a final currency.

Referring to the Figures wherein like numerals indicate like or corresponding parts, a system for transferring funds from senders in a starting currency to desired recipients in a final currency is shown at 40 in FIG. 1. Senders and recipients may be individuals, companies, charities, and the like. Senders will be able to access and transfer funds to recipients from their accounts anywhere, and at anytime. This is accomplished by providing a single web-based platform capable of being conveniently accessed with a multitude of devices. The system 40 merges banking and money transfer into one convenient tool for users.

The system 40 also provides senders with flexibility in selecting how the fund transfer is carried out. More particularly, the system 40 provides senders with an opportunity to select a conversion rate (aka exchange rate) from a list of conversion rates for their transactions. Each conversion rate is associated with a financial institution (referred to hereinafter as a "currency converter" or "converter institution"). The sender can select the conversion rate based on the rate itself or the reputation or familiarity with the converter institution. Thus, senders have options for converting senders' funds from the starting currency to the final currency. The system 40 likewise provides the converter institutions with an opportunity to increase their currency conversion business.

The terms "sender" and "recipient" used throughout this detailed description are not intended to be limiting. The term "sender" merely refers to the individual or entity sending funds. The term "recipient" merely refers to the individual or entity receiving the funds from the sender. Indeed, any individual or entity can act as both "sender" and "recipient".

Referring to FIG. 1, the system includes an account network 42. The account network 42 comprises a plurality of servers including one or more web servers, communication servers, proxy servers, application servers, file servers, and/or database servers that operate software, send and retrieve data, and store data, for purposes of carrying out the invention. The servers may be located in one or more countries of the world. The servers are configured to communicate with one another using conventional methods. A database 44 stores data for the account network 42. Data is sent to or retrieved from the database 44 by one or more of the servers. Each server typically includes a central processing unit (CPU), memory, and hard disk storage.

Sender workstations 46 communicate with the account network 42 through the Internet 48 or other network. Only one sender workstation 46 is shown in FIG. 1, but it's understood that multiple sender workstations 46 could be connected in the same manner. The sender workstations 46 may be personal computers such as laptops or desktops, networks, PDAs, mobile devices, mobile phones, other personal electronic devices, ATMs, and the like. The sender workstations 46 include one or more processors, memory, storage, at least one input device, and a display device.

Users of the sender workstations 46 access the account network 42 through the Internet 48 in a manner well known to those having ordinary skill in the e-business arts. The sender workstations 46 allow users of the system 40 to setup an account on the account network 42 and/or access their account to perform a variety of tasks, including fund transfers.

Converter workstations 50 also communicate with the account network 42 through the Internet 48 or other network. Three converter workstations 50 are shown, but more could be connected in the same manner. The converter workstations 50 may be personal computers such as laptops or desktops, networks, PDAs, mobile devices, mobile phones, other personal electronic devices, ATMs, and the like. The converter workstations 50 include one or more processors, memory, storage, at least one input device, and a display device.

Currency converters, i.e., financial institutions that convert currency from one form to another, use the converter workstations 50 to access the account network 42 through the Internet 48 in a manner well known to those having ordinary skill in the e-business arts. The converter workstations 50 allow the currency converters to setup an account on the account network 42 and/or access their account to perform a variety of tasks, including submitting conversion rates to the account network 42.

Recipient workstations 52 communicate with the account network 42 through the Internet 48 or other network. The recipient workstations 52 may be personal computers such as laptops or desktops, networks, PDAs, mobile devices, mobile phones, other personal electronic devices, ATMs, and the like. The recipient workstations 52 include one or more processors, memory, storage, at least one input device, and a display device. The recipient workstations 52 are the same as the sender workstations 46, but are identified separately for purposes of clarity.

Users of the recipient workstations 52 access the account network 42 through the Internet 48 in a manner well known to those having ordinary skill in the e-business arts. The recipient workstations 52 allow users of the system 40 to setup an account on the account network 42 and/or access their account to perform a variety of tasks, including verifying and accessing transferred funds.

Bank A network 54 communicates with the account network 42 through the Internet 48 or other network. The Bank A network 54 can include one or more banks that have been affiliated with the fund transfer service of the invention and are used by the fund transfer service to hold user funds. The banks have separate bank identification numbers stored in the database 44 for access by the account network 42. The bank identification numbers are associated with the sender account nos. in the database 44.

The Bank A network has workstations (each bank has its own workstations) including personal computers such as laptops or desktops, networks, PDAs, mobile devices, mobile phones, other personal electronic devices, ATMs, and the like. The workstations include one or more processors, memory, storage, at least one input device, and a display device.

The Bank A network 54, via the appropriate affiliated bank, maintains the sender's funds in the starting currency for access by the account network 42 in the event of a fund transfer. Account network 42 uses the Bank A network 54 to access the sender's available funds through the Internet 48 in a manner well known to those having ordinary skill in the e-business arts.

Bank B network 56 communicates with the account network 42 through the Internet 48 or other network. The Bank B network 56 can include one or more banks that have also been affiliated with the fund transfer service of the invention. The banks have separate bank identification numbers stored in the database 44 for access by the account network 42.

The Bank B network has workstations (each bank has its own workstations) including personal computers such as laptops or desktops, networks, PDAs, mobile devices, mobile phones, other personal electronic devices, ATMs, and the like. The workstations include one or more processors, memory, storage, at least one input device, and a display device. The Bank B network 56, via the appropriate affiliated bank, maintains the converted funds in the final currency for access by the account network 42 in the event of a fund transfer. Account network 42 uses the Bank B network 56 to access the recipient's received funds (i.e., sender's converted funds) through the Internet 48 in a manner well known to those having ordinary skill in the e-business arts.

Account card access points 58 are also available for the users of the system 40, including senders and recipients, to use account cards 60. The system 40 is configured so that the users can add funds to their account cards 60 at the account card access points 58 or retrieve funds from their account cards 60. The account card access points 58 could be account card machines provided at retail stores, grocery stores, gas stations, and other points of sale. The account card access points 58 could also be at ATMs, or kiosks specifically configured for adding or retrieving funds to or from the account cards 60 in the form of actual currency. Account cards 60 can be purchased online through the account network 42 or at retail locations.

Referring to FIG. 2, and steps 100-110, the system 40 is configured to allow senders and recipients to setup and maintain membership accounts on the account network 42. By holding an account, the senders and recipients can send and/or receive money in a fast, direct, and secure manner to and/or from other account holders on the account network 42. Funds may be sent to other account holders domestically and globally.

In step 100 the sender uses the sender workstation 46 to transmit sender information to the account network 42. Sender information can include individual name, company name, individuals associated with the company, address, telephone number, driver's license or other identification no., date of birth, email address, security question and answer, desired user name, password, payment information for adding funds such as credit card, account card, gift card, and the like. The sender enters the information onto a form (such as that shown in FIGS. 6 and 7) and then selects a toggle button on the form to submit the information.

The sender information is stored in the database 44 to create the sender account in step 102. Once the account is created, the account network 42 sends a unique account number back to the sender. The account network 42 also associates the sender information with the sender and its account number in the database 44. The available funds in the Bank A network 54 are associated with the sender account in step 104 so that the system 40 is aware of the amount of funds available for transfer by the sender during operation. This amount is continuously updated as funds are transferred out or received in.

Senders also add potential recipients to a friend list using a form shown in FIG. 16. Friends are added to the sender's account by entering friend information such as name, user name, email address, the friend's account number (if already has an account), and friend's country. Friends are persons/entities that the sender is identifying as potential recipients of the sender's funds and are stored along with the sender's account for easy access when transferring funds. Once the friend information is entered, the sender actuates a toggle button on the form (such as by clicking a mouse with a cursor positioned over the button or touching the button for touch screens) and the friend information is sent to the account network 42, associated with the sender's account, and stored in the database 44.

Funds can be added to the sender's account in several ways (see FIG. 15, for example). Funds can be direct deposited from salary/wages into the sender's account using the sender's unique sender account number. The Sender or designee thereof will be able to apply credit to their account in any denomination by visiting a designated or authorized financial institution in the Bank A network 54. Funds can also be obtained online by receiving funds from other account holders. More particularly, account holders that hold funds in the same currency can swap funds with other account holders. Sender funds can also be obtained by online transfer from bank accounts or credit cards. ATMs can also be used to add funds to the account or to retrieve funds from the account. All sender funds are stored in the designated bank of the Bank A network under the unique banking account no. associated with the sender in the database 44.

In step 106 the recipient uses the recipient workstation 52 to transmit recipient information to the account network 42. The recipient information is the same as the sender information. The recipient information is stored in the database 44 to create the recipient account in step 108. The recipient is also assigned an account number in the same manner as the sender. The available funds in the Bank B network 56 are associated with the recipient account in step 110 so that the system 40 is aware of the amount of funds available for retrieval by the recipient during operation. This amount is continuously updated as funds are transferred out or received in.

Referring to FIG. 3, and steps 112, 114, the currency converters transmit converter information to the account network 42. Converter information can include institution name, address, telephone number, tax ID number, employee ID number, email address, security question and answer, user code, password, and payment information (fees charged to converters for using system 40). Once the converter (or employee thereof) enters the converter information into the form (see, e.g., FIG. 8), the converter actuates a toggle button on the form to send the information to the account network 42. In step 114, the converter information is stored in the database 44 to create a converter account. Once the converter account is created, the converter is assigned an account number. The converter account allows the converter to transmit current conversion rates to the account network 42 and also to receive orders from the account network 42 when a conversion rate is selected by a sender for a transaction. The converter information is associated with the converter's account no. and stored in the database 44.

Figure 4:
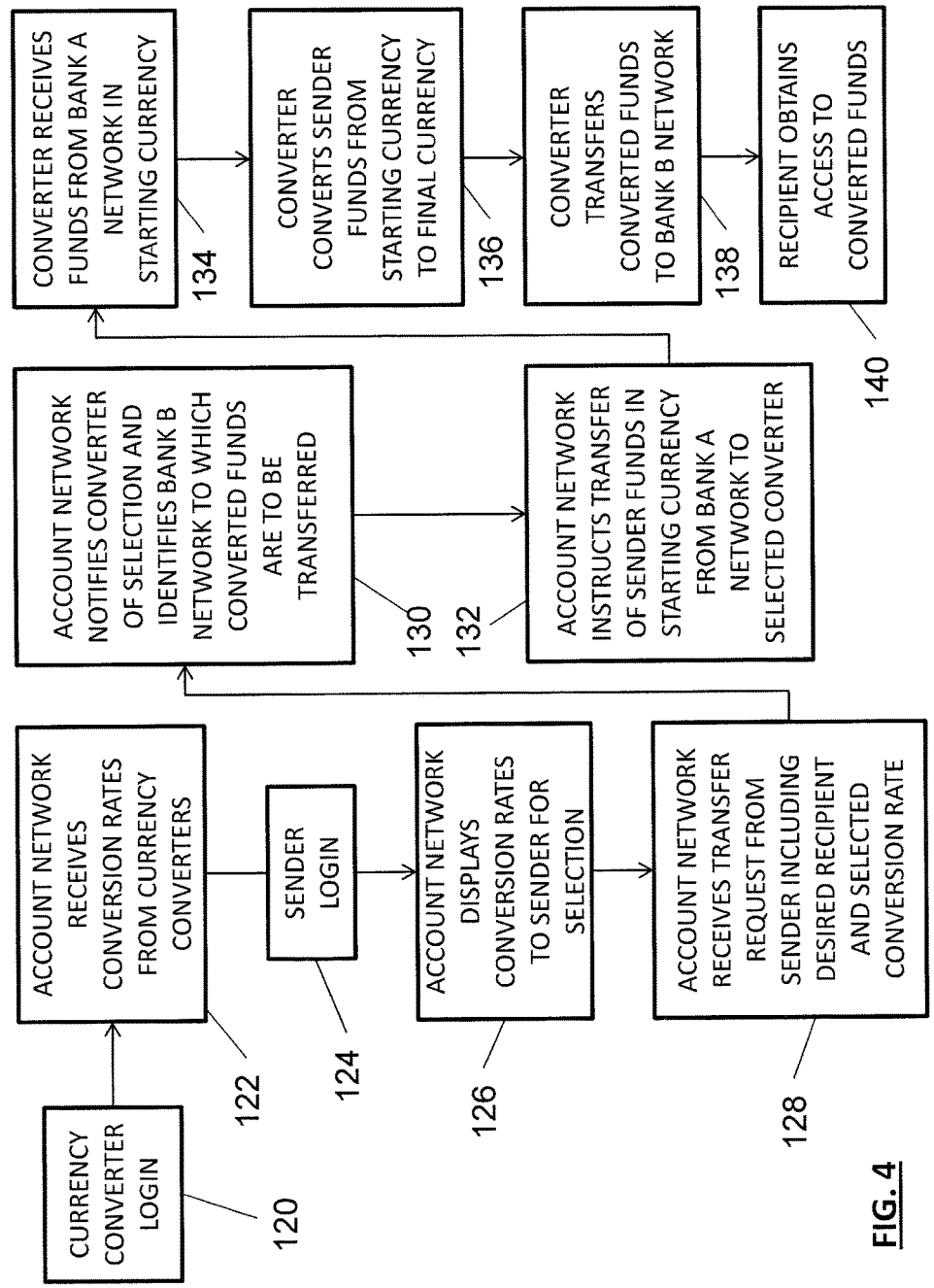
FIG. 4 is a flow chart outlining steps of converting sender funds from a starting currency to a final currency.

Referring to FIG. 4, general operation of the system 40 is shown for a sender to transfer funds in a starting currency to a recipient in a final currency. Senders can send funds to anyone on their friends list, or any other authorized user on the account network 42. In some cases, the recipient must be enrolled in the account network 42. However, in other cases, the recipient is not required to be enrolled and can simply access the received funds through their account card 60, which was previously mailed to them from the sender. In this manner, the recipient is not required to access the account network 42.

In step 120 the currency converters login to the account network 42 and transmit their conversion rates to the account network 42 in step 122. The form used to transmit this information is shown in FIG. 13. Once logged in to its account on the account network 42, the currency converter can enter new conversion rates every predetermined time period, whether every hour, day, week, etc. Once the new rate is entered for a particular country, the converter selects a toggle button on the form and the conversion rate is transmitted to the account network 42 and then stored in the database temporarily until a new conversion rate is submitted.

The senders also login in step 124. The software, in step 126, displays all of the conversion rates and associated currency converters to the sender on the sender workstation 46. See a sample display and form in FIG. 14. Providing senders with the ability to select conversion rates allows a sender to maximize conversion yields, but also allows converters to vie for currency exchange business. The converter financial institutions display their rates simultaneously in a competitive manner to attract account-holding sender's purchases. Senders desiring to obtain best rates will influence how often and how competitively financial institutions adjust their conversion rates within a system refresh period.

The system refresh period is a duration of time determined by the account network 42 (e.g. hourly, every two hours, or any other period determined), in which the converter financial institutions are given an opportunity beforehand to adjust their rates on the account network 42 in order to attract customer transactions. Updated exchange rates along with the institutions that offer them will be displayed in an ascending or descending order giving the best rate (and its institution) a premium display. Other institutions and their rates will also be displayed to account holders and may be chosen as well. The system will be refreshed periodically (e.g. hourly, or any other time frame determined by the account network 42) to allow each financial institution to change its previous rates and compete against other financial institution with better rates until the system conducts another scheduled system refresher. Financial institutions compete for premium display by adjusting rates discreetly ahead of next scheduled system refresher.

The sender inputs transaction information into the sender workstation 46 which is then transmitted to the account network 42 via the Internet 48 in step 128. The transaction information includes at least an identification of the desired recipient of the converted funds, an identification of the country and final currency for the transaction, the amount of the funds to be transferred from the sender to the recipient, whether the transfer is one-time only or recurring, any messages to be sent to the recipient, and the selected conversion rate and associated currency converter institution. Since both the conversion rates and the currency converters identification is displayed to the sender, the sender has the ability to choose a desired conversion rate and converter institution. Once all the information is entered or selected, the user actuates a toggle button on the form and the information is sent to the account network 42.

In step 130, once the account network 42 has received the transfer request from the sender, and the account network 42 verifies available funds, the account network 42 notifies the converter of their selection by the sender and instructs the converter on which bank in the Bank B network 56 to send the converted funds, i.e., electronic versions of the funds. This instruction can be in the form of an automatic transmission of a request from a server of the account network 42 to a server of the Bank B network 56.

The account network 42 simultaneously, just before, or thereafter, in step 132, instructs the Bank A network 54 to transfer the sender's funds in the starting currency to the currency converter. This means that the account network 42 informs the bank in the Bank A network 54 of which banking account no. the funds are kept and the amount of the funds to be sent to the currency converter.

In today's banking world, this means that an electronic deduction is made from the sender's account with its bank in the Bank A network 54 and the electronic version of the funds is sent to the currency converter—actual, physical funds are not required to be transferred, but could be in some embodiments.

The currency converter receives the funds (i.e., electronic version of the funds) from the Bank A network 54 in the starting currency in step 134. Then, in step 136, the converter converts the sender funds from the starting currency to the final currency based on the conversion rate selected by the sender (this is an electronic conversion). The converter electronically transfers the converted funds, in the final currency, to the Bank B network 56, in step 138. Once the funds are entered into the predetermined bank in the Bank B network 56, the recipient has access to the converted funds in step 140. The recipient can retrieve the funds either by using the account card 60 at a account card access point 58, by withdrawing funds from the bank on the bank B network 56 in a conventional fashion, or by simply using the account card 60 in any way familiar to those having ordinary skill in the banking arts.

It should be appreciated that the communication between the workstations 46, 50, 52, Bank A network 54, Bank B network 56, and account network 42 are electronic. The instructions, requests, transmissions, or other forms of communication previously described utilize conventional methods of data transmission between networks and computers associated with those networks as is well understood by those having skill in the data communication arts. Details of the communication, network, and the form of data transmissions are, therefore, not described in detail.

An example of the web-based forms used by the senders, recipients, and converter institutions is shown in FIGS. 5-20. Recall that senders and recipients can be individual customers of the system 40 or corporate customers. In some cases, the web-based forms show individual customers and in other cases corporate customers.

Referring to FIG. 5-8, to utilize services of the system 40, an individual or entity must first set up an account. Setting up an account may be done online by accessing the services homepage shown in FIG. 5, or at the point of purchase of a membership account card 60. At the end of this process the user's discrete, unique, account number will be generated and issued to the individual or entity. See FIGS. 6, 7, 8 for individual customer, corporate entity customer, and financial institution account creation process, respectively. After the account is created, the users can login using their respective login pages shown in FIGS. 9 and 10.

If an account card 60 is purchased before an account is set up online, then that account card 60 must be activated and an account set up before that account card 60 may be used. Account cards 60 may be activated (after an account is created) at the point of purchase, or online at the account network's website. This applies to an individual or corporate entity, and is referred to as syncing the user's account to his/her or the entity's account card 60. See FIGS. 11 and 12. To sync the card, the user simply enters the card no. on the form and then actuates the toggle button labeled "Sync Account to Card Now" on the form to transmit the information to the account network 42. The account network 42 associates the user's account no. with the account card number in the database 44 for future reference. Referring to FIG. 12, corporate senders or entities have the ability to sync multiple cards to one account.

If an individual or entity sets up an account before purchasing an account card 60, the individual or entity may purchase a account card 60 at a later time and have that account card 60 synced to their account later. Note that even before the individual or entity purchases an account card 60, that sender or entity is capable of adding or transferring funds from their account to a desired recipient or another account.

Converter institutions e.g., banks, credit unions, or other authorized financial institutions, may seek membership, preferably for a fee. See FIG. 8. Financial institutions may be domestic and/or international. With membership, financial institutions are able to compete for money conversion (foreign exchange) business from the network's individual and entity customers. See FIG. 8 for detailed steps of the account creation process for converter financial institutions.

Converter institutions are capable of adjusting their exchange rates or charges remotely from their workstations 50 (See FIG. 13). This is done online on the account network's website. This process and rate adjustment should be done discreetly to ensure each converter institution has a good chance to be competitive against other converter institutions for a period e.g. hourly, or any other time period desired. At the end of this period, the account network 42 will be refreshed and any new rate changes set by the converter financial institutions will then become available to customers.

Referring to FIG. 13, rates are set by converter institutions on the network using a rate setting form. On the rate setting form, the converter institution enters or selects the countries of conversion, e.g., US Dollar to Jamaican Dollar, and the new rate, and confirms the new rate. The current rate is also displayed to the converter on the display of the converter workstation 50. Once set, the converter actuates a toggle button labeled "Set New Rate Now" on the form and the new rate is sent to the account network 42. The new rates will then be displayed collectively to account holders, in ascending or descending order, or any other order, with the best rate for that period being given a premium display spot for customer viewership (see FIG. 14).

Figure 20:
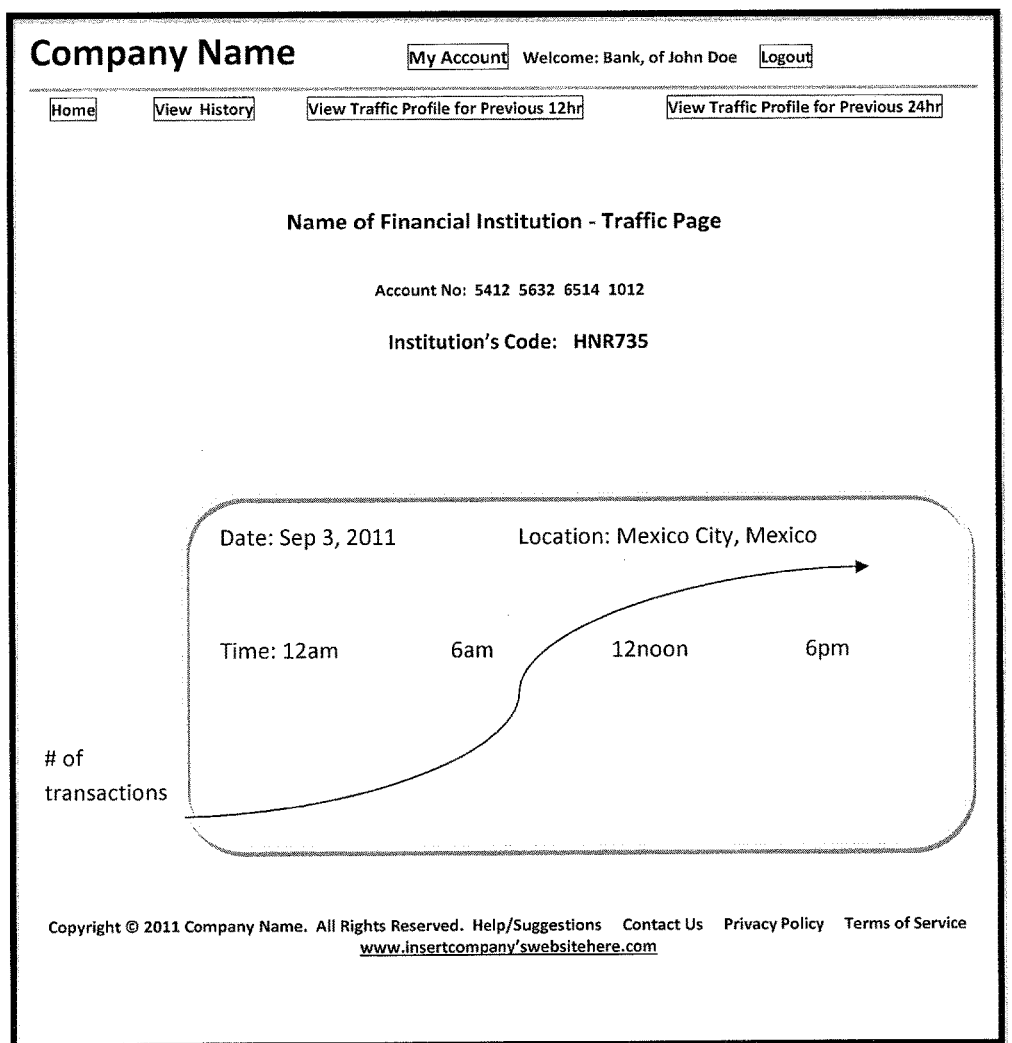

Converter institutions are able to observe customer traffic flow through a traffic window that graphically displays customer traffic for any specific period (see FIGS. 13 and 20). This feature allows converter institutions to observe trends, make prediction on future traffic flow, and set new rates for the next system refresher period. Referring specifically to FIG. 20 the traffic window may allow the converter institutions to view the number of transactions in which that particular converter institution was selected versus time. The traffic window may also track converted amounts versus time by country, or the like.

Referring to FIG. 14, the individual or entity can set up their transactions and transmit transaction information to the account network 42. First, the user chooses the country destination and converter institution from which local funds (with displayed exchange rates) will be bought. A number of financial institutions: 1 to an infinite amount may be available here. The user also indicates the amount of funds to be transferred, and is able to compose custom messages to the intended recipient(s) of the funds. The user can also dictate whether the transfer is one-time or recurring. Once the information is entered, the user actuates the toggle button labeled "Confirm & SEND" to confirm and send the transaction information to the account network 42. In some cases, due to the electronic nature of the system 40, the funds are available to the recipient in a reasonably short time frame. In some cases, this may be less than 5 minutes, and in further embodiments less than 2 minutes. In other cases, however, to ensure the availability of funds, transactions can take longer.

On this form, the user can also see the available funds in their account after the transaction, the amount in the starting currency able to be transferred (after calculating out transaction fee), the amount received by the recipient in the final currency, current weather conditions in the sender and recipient countries, and the current time in the sender and recipient countries. Also displayed is each conversion rate offered by the converter institutions. Rates may or may not be displayed in an ascending or descending numeric order along with institution, with the best rate and that institution given premium display.

As previously described, rates are capable of being updated by each converter institution. Converter financial institutions not occupying the premium spot for that refreshed period may offer additional features, products or deals e.g. deals such as "use us and our current rate and you are guaranteed the next 4 transactions at a $2.00 savings off our present exchange rate."

Once the financial institution and conversion rate is chosen and purchased, and the transaction information is routed to the account network 42, the account network 42 instructs the bank in the Bank A network 54 holding the sender's funds to send the funds to the converter institution. The converter institution then sends, based on instructions from the account network 42, converted funds to an integrated bank account at a bank in the Bank B network 56—possibly located in the recipient country. This integrated bank account keeps all monies routed to this bank in a single general account assigned to the recipient's account card number or other unique account number or identification number.

Now the recipient has access to the converted funds. The recipient account is credited, and funds are accessible directly from recipient's account card 60 for purchases, or for cash at ATM or point of purchase, or financial institution, or network service providers.

In order for the sender to transfer funds to the recipient, the sender's account must have available funds. Funds may be added to the sender's account in a number of ways as previously described. See FIG. 15 for details on how to step by step add funds to a customer or corporate entity's account. Funds can be added by entering debit card, credit card, or gift card information into the form shown in FIG. 15 and actuating the toggle button labeled "Pay Now" to add the funds to the account. A service charge may be associated with funding the account in this manner. Other ways of funding the account have previously been described, but include transfers from other account holders, and direct deposits from employers.

Referring to FIG. 16, individual or corporate users may add friends to their friends list for easy access using the form shown. Whenever funds transfer or any other contact is initiated e.g. texting etc., to a listed friend or contact, fields may be auto-filled from the friend's list stored in the database 44 for that particular user.

Figure 17:
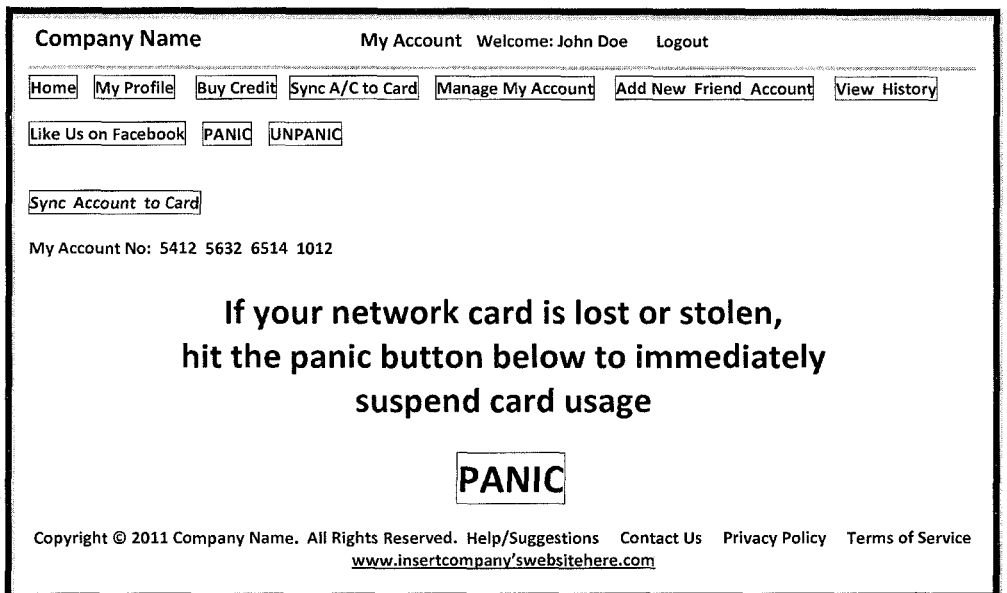
Figure 18:
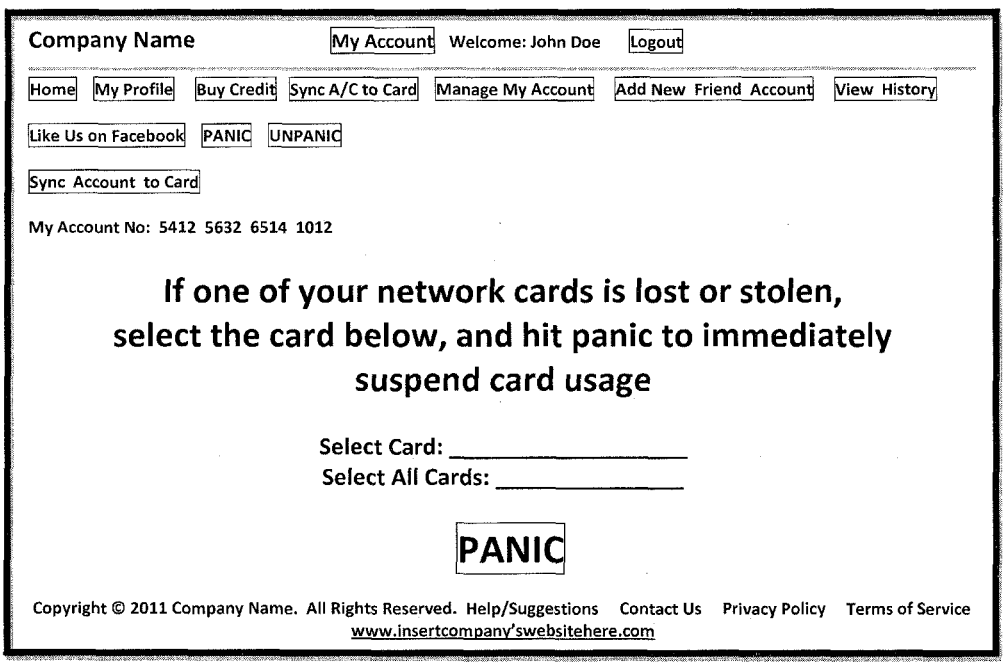
Figure 19:
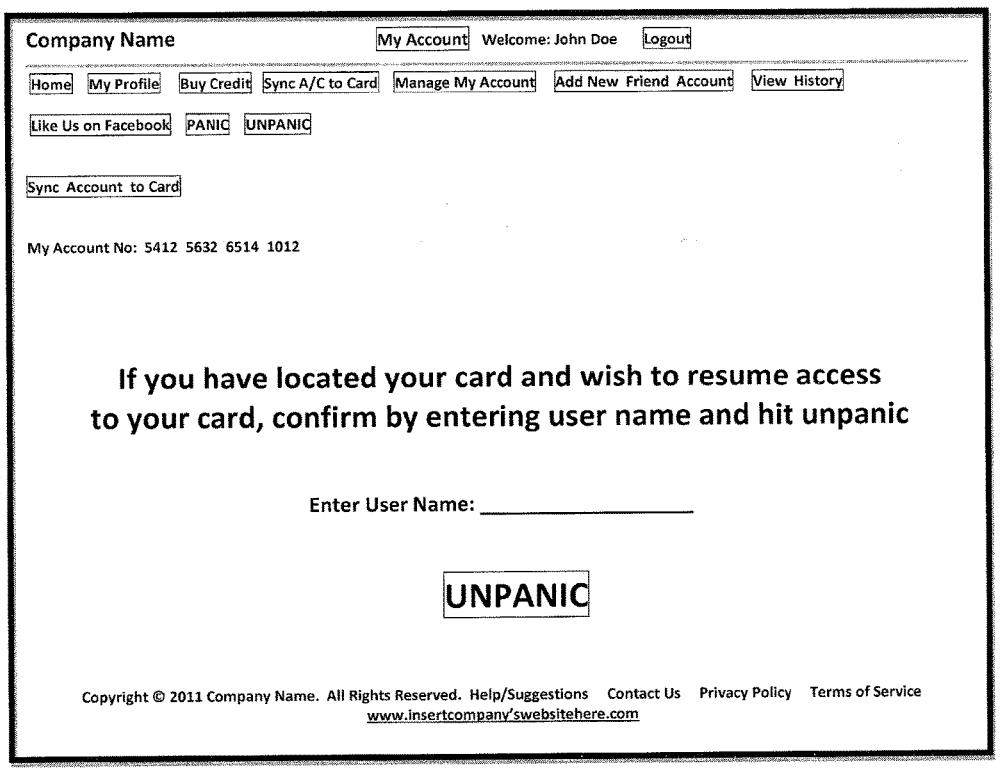

In the event an individual or entity loses or misplaces their account card 60, the account holder may suspend further use of such card by activating the card panic mode (See FIGS. 17 and 18). This is accomplished by simply actuating the toggle button labeled "PANIC" on the forms in FIGS. 17 and 18. In the event the individual or entity safely recovers the card, the account holder my reactivate the recovered card by actuating the toggle button labeled "UNPANIC" in FIG. 19 thereby "unpanicing" such card from their account.

Obviously many modifications and variations of the present invention are possible in light of the above description. While this description is directed to particular embodiments, it is understood that those skilled in the art may conceive of modifications and/or variations to the specific embodiments shown and described herein. Any such modifications or variations, which fall within the purview of this description, are intended to be included herein as well. It is understood that the description herein is intended to be illustrative only and is not intended to be limited.

What is claimed is:

1. A computer system for transforming funds from a first currency to a second currency and transferring the funds to a desired recipient, said system comprising:

an account card associated with the recipient;

a mobile communication device associated with the recipient;

a recipient workstation having a display device and an input device for setting up an account for the recipient and for activating a first toggle button to suspend further use of said account card in the event said account card is lost or stolen until the recipient recovers said account card and activates a second toggle button to enable further use of said account card;

a sender workstation having a display device and an input device for entering transaction information into a customer module of software wherein the transaction information includes an identification of the recipient, a mobile alert number for communicating with the recipient, a customized message to be sent to the mobile communication device upon a sender confirming a transaction associated with the recipient so that the recipient is notified that the funds have been transferred for access by the recipient using said account card, an amount to be transferred in the first currency, and an identification of the second currency of the funds to be transferred;

an account network in communication with said sender workstation, said account network including one or more servers operating a database for storing the transaction information and associating said transaction information with a unique sender account number and available funds for transfer by the sender wherein the available funds are in the first currency; and a plurality of converter workstations in communication with said account network, each of said converter workstations associated with one of a plurality of different currency converters and having an input device for entering converter information into a conversion module of the software wherein the converter information includes a unique converter identification number and a conversion rate for converting the funds from the first currency to the second currency, wherein the customer module displays on said display device of said sender workstation to the sender the conversion rates of the plurality of different currency converters thereby allowing the sender to select the conversion rate and associated currency converter for transferring the funds to the recipient, wherein the conversion module of the software is configured to:

display to a first currency converter of the plurality of different currency converters first graphical time-based trend information attributed to the first currency converter, wherein the first graphical time-based trend information is based on a number of transactions in which senders selected the conversion rate of the first currency converter or is based on amounts converted by the first currency converter; and display to a second currency converter of the plurality of different currency converters second graphical time-based trend information attributed to the second currency converter, wherein the second graphical time-based trend information is based on a number of transactions in which senders selected the conversion rate of the second currency converter or is based on amounts converted by the second currency converter.

2. The computer system for transforming funds from a first currency to a second currency and transferring the funds to a desired recipient of claim 1, wherein the one or more servers comprise one or more bank servers in communication with one or more banks for providing a conversion rate.

3. The computer system for transforming funds from a first currency to a second currency and transferring the funds to a desired recipient of claim 1, wherein the one or more servers comprise a first bank server in communication with the sender workstation and a second bank server in communication with a recipient workstation.

4. The computer system for transforming funds from a first currency to a second currency and transferring the funds to a desired recipient of claim 1, further comprising an account card machine for dispensing the funds to the recipient having said account card.

5. The computer system for transforming funds from a first currency to a second currency and transferring the funds to a desired recipient of claim 4, wherein the account card machine is an ATM.

6. The computer system for transforming funds from a first currency to a second currency and transferring the funds to a desired recipient of claim 1, further comprising an account database for storing the sender account information and the recipient account information.

7. The computer system for transforming funds from a first currency to a second currency and transferring the funds to a desired recipient of claim 1, wherein the currency converter comprises a financial institution computer system.

8. A computer implemented method for transforming funds from a first currency to a second currency and transferring the transformed funds to a recipient having an account card and a mobile communication device, said method comprising:

providing a software application operational at least in part on a network including a server for receiving and transmitting a plurality of converter options;

receiving transaction information from a sender workstation in communication with the network including an identification of the recipient, a mobile alert number for communicating with the recipient, a customized message to be sent to the mobile communication device upon a sender confirming a transaction associated with the recipient so that the recipient is notified that the funds have been transferred for access by the recipient using the account card, an amount of the funds in the first currency to be transferred, and an identification of the second currency;

establishing an account for the recipient so that the recipient is able to activate a first toggle button to suspend further use of the account card in the event the account card is lost or stolen until the recipient recovers the account card and activates a second toggle button to enable further use of the account card;

storing the transaction information and associating the transaction information with a unique sender account number;

receiving the plurality of converter options from a plurality of different currency converters including, receiving from each of the plurality of different currency converters, a conversion rate for converting the funds from the first currency to the second currency;

transmitting to the sender workstation the conversion rates of the plurality of different currency converters so that the conversion rates can be displayed to the sender on the sender workstation thereby allowing the sender to select the conversion rate and associated currency converter for transferring the funds to the recipient;

transmitting to a first currency converter of the plurality of different currency converters first graphical time-based trend information attributed to the first currency converter so that the first graphical time-based trend information can be displayed to the first currency converter on a first converter workstation in communication with the network, wherein the first graphical time-based trend information is based on a number of transactions in which senders selected the conversion rate of the first currency converter or is based on amounts converted by the first currency converter; and transmitting to a second currency converter of the plurality of different currency converters second graphical time-based trend information attributed to the second currency converter so that the second graphical time-based trend information can be displayed to the second currency converter on a second converter workstation in communication with the network, wherein the second graphical time-based trend information is based on a number of transactions in which senders selected the conversion rate of the second currency converter or is based on amounts converted by the second currency converter.

9. The computer implemented method for transforming funds from a first currency to a second currency and transferring the transformed funds to a recipient of claim 8, wherein the plurality of converter options are provided by a plurality of money conversion entities.

10. The computer implemented method for transforming funds from a first currency to a second currency and transferring the transformed funds to a recipient of claim 8, further comprising, storing the transaction information and sender account number in a database associated with the software application.

11. The computer implemented method for transforming funds from a first currency to a second currency and transferring the transformed funds to a recipient of claim 8, further comprising:
   selecting the conversion rate and associated currency converter;
   converting the funds from the first currency to the second currency based on the conversion rate;
   transferring the funds to a location identified by the sender; and
   withdrawing the funds in the second currency by the recipient.

12. The computer implemented method for transforming funds from a first currency to a second currency and transferring the transformed funds to a recipient of claim 8, further comprising, selecting the conversion rate and associated currency converter.

13. The computer implemented method for transforming funds from a first currency to a second currency and transferring the transformed funds to a recipient of claim 8, further comprising, using the account card to withdraw the funds from an account card machine.

14. The computer implemented method for transforming funds from a first currency to a second currency and transferring the transformed funds to a recipient of claim 13 wherein the account card machine is an ATM.

15. A computer implemented method for transforming funds from a first currency to a second currency and transferring the transformed funds to a recipient having an account card and a mobile communication device, said method comprising:
   providing a money conversion system comprising a software application operational at least in part on a network including a server for receiving and transmitting a plurality of converter options;
   eliciting from a plurality of different converter entities the plurality of converter options for converting the first currency to the second currency;
   establishing an account for the recipient so that the recipient is able to activate a first toggle button to suspend further use of the account card in the event the account card is lost or stolen until the recipient recovers the account card and activates a second toggle button to enable further use of the account card;
   receiving transaction information from a sender workstation in communication with the network including an identification of the recipient, a mobile alert number for communicating with the recipient, a customized message to be sent to the mobile communication device upon a sender confirming a transaction associated with the recipient so that the recipient is notified that the funds have been transferred for access by the recipient using the account card, an amount of the funds in the first currency to be transferred, and an identification of the second currency;
   receiving the plurality of converter options from the plurality of different converter entities including a conversion rate for converting the funds from the first currency to the second currency;
   transmitting to the sender workstation the plurality of converter options so that the plurality of converter options can be displayed to the sender on the sender workstation;
   transmitting to a first converter entity of the plurality of different converter entities first graphical time-based trend information attributed to the first converter entity so that the first graphical time-based trend information can be displayed to the first converter entity on a first converter workstation in communication with the network, wherein the first graphical time-based trend information is based on a number of transactions in which senders selected the conversion rate of the first converter entity or is based on amounts converted by the first converter entity; and
   transmitting to a second converter entity of the plurality of different converter entities second graphical time-based trend information attributed to the second converter entity so that the second graphical time-based trend information can be displayed to the second converter entity on a second converter workstation in communication with the network, wherein the second graphical time-based trend information is based on a number of transactions in which senders selected the conversion rate of the second converter entity or is based on amounts converted by the second converter entity.

16. The computer implemented method for transforming funds from a first currency to a second currency and transferring the transformed funds to a recipient of claim 15 further comprising, assigning and storing a unique transaction code for the transfer of the funds.

17. The computer implemented method for transforming funds from a first currency to a second currency and transferring the transformed funds to a recipient of claim 15 further comprising, assigning and storing a unique transaction code for the transfer of the funds.

18. The computer implemented method for transforming funds from a first currency to a second currency and transferring the transformed funds to a recipient of claim 15 further comprising, the sender selecting the location for receipt of the funds in the second currency.

19. The computer implemented method for transforming funds from a first currency to a second currency and transferring the transformed funds to a recipient of claim 15 further comprising, the recipient using the account card to withdraw the funds from an ATM.

\* \* \* \* \*